July 10, 1934.    C. G. STEFFEN    1,966,269
MACHINE FOR DIVIDING DOUGH AND THE LIKE
Filed Sept. 24, 1932    2 Sheets-Sheet 1

INVENTOR
Charles G. Steffen
BY
ATTORNEY

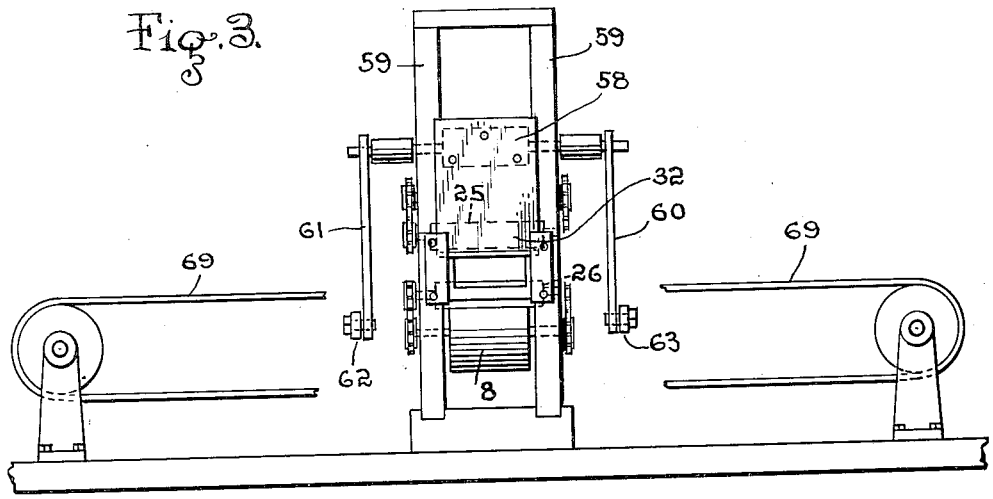
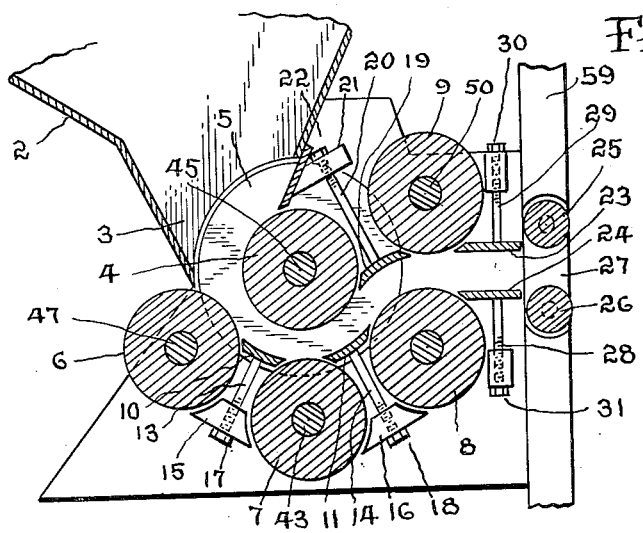

Patented July 10, 1934

1,966,269

UNITED STATES PATENT OFFICE 1,966,269

MACHINE FOR DIVIDING DOUGH AND THE LIKE

Charles G. Steffen, South Jamaica, N. Y., assignor to New York Dugan Brothers, Inc., Brooklyn, N. Y., a corporation of New York Application September 24, 1932, Serial No. 634,649

4 Claims. (Cl. 107—15)

My invention relates to improvements in machines for dividing dough and the like.

An object of my invention is to provide a new and useful device of the character specified; other objects will appear from the following specification and claims.

Figure 1:
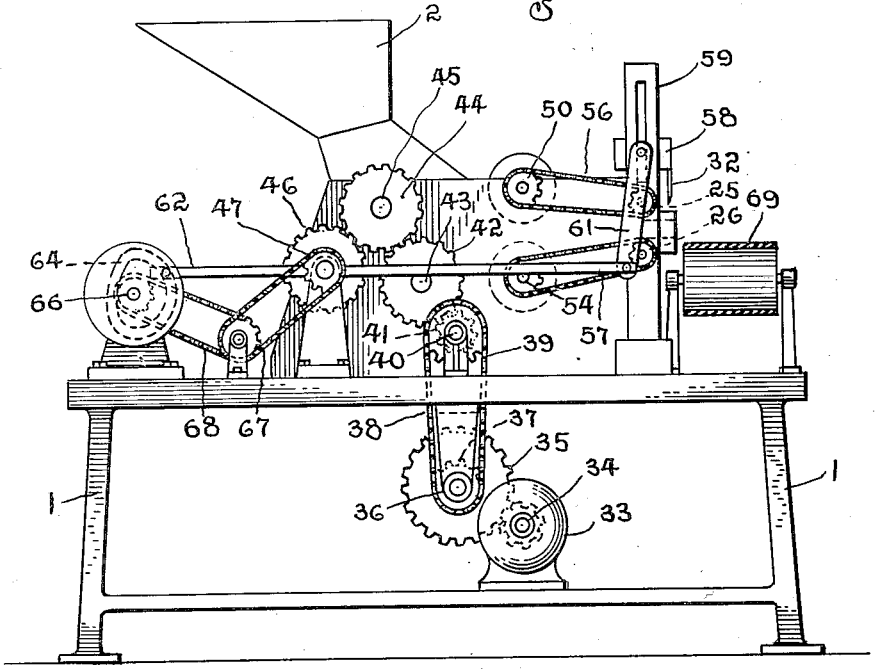
Figure 2:
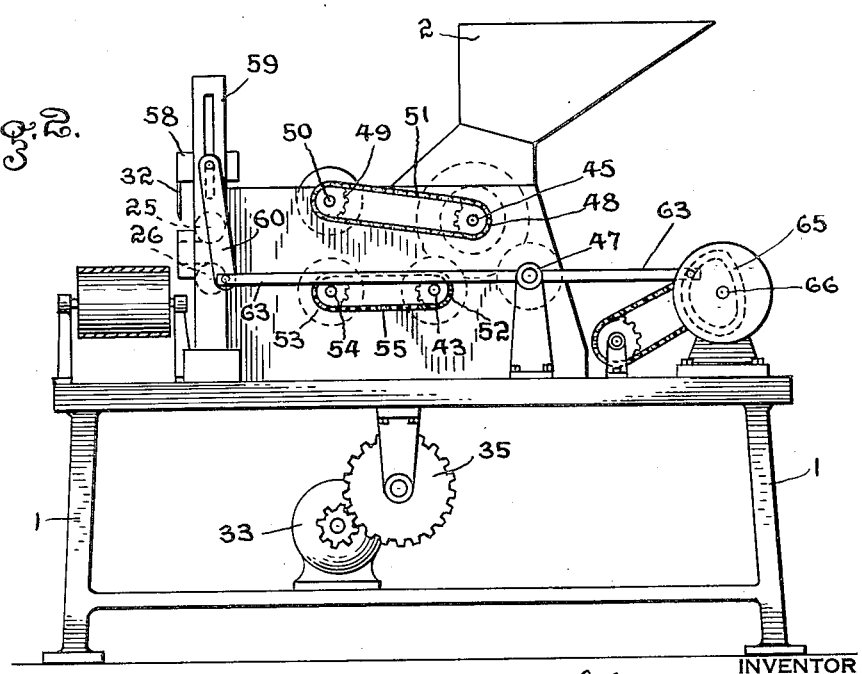

A preferred embodiment of my invention is illustrated in the accompanying drawings in which Figure 1 is a side view of a machine embodying my invention, Figure 2 is a view of the same from the side opposite that shown in Figure 1, Figure 3 is a front view of the machine, and Figure 4 is a vertical section of a detail of the hopper, rollers and adjacent parts.

Similar characters of reference refer to similar parts throughout the several views.

It is to be understood that I do not limit myself to the precise form and details of the machine shown and described and that changes and modifications may be made therein without departing from my invention.

The machine illustrated is mounted upon a base 1 and includes a hopper 2 having a delivery mouth or port 3 which discharges the contents of the hopper 2 between a pair of rotary rollers 4 and 6, the roller 4 preferably provided with upstanding flanges 5.

Auxiliary guide rollers 7, 8 and 9 are spaced about and equidistant from the roller 4. The roller 7 acts as a conveyor roller and, with the roller 4, conveys the dough from the rollers 4 and 6 to the rollers 8 and 9.

Intermediate the rollers 6, 7 and 8 are provided peripheral scraper plates 10 and 11 adjustably positioned with reference to the rollers by means of threaded bolts 13 and 14 respectively on which are shaped washers 15 and 16 and threaded nuts 17 and 18.

A like scraper plate 19 is provided between the peripheries of the rollers 4 and 9 and arranged tangentially thereto and is adjustably positioned by means of a threaded bolt 20, washer 21 and nut 22.

As shown in Figure 4, there is thus provided a discharge passageway from the delivery mouth of the hopper 2, between the roller 4 and the adjacent rollers 6, 7 and 8.

The scraper plate 19 serves to deflect the said discharge passageway away from the roller 4 and the said passage way leads therefrom between the rollers 8 and 9 and the plates 23 and 24 to the rollers 25 and 26 which form the discharge port 27 of the said passage way.

The plates 23 and 24 are adjustably positioned by means of the threaded bolts and the nuts 30 and 31 thereon.

At the discharge port 27 there is provided a reciprocating knife 32 which cuts off portions of the dough delivered through the discharge port 27 below the said knife.

The device, in the form illustrated, is driven by a suitable motor 33 having a toothed drive pinion 34 geared to toothed wheel 35 on the shaft 36 on which there is a sprocket 37 operatively connected by means of a drive chain 38 to a sprocket wheel 39 mounted on a shaft 40 which carries a pinion 41 engaging a toothed gear 42 on the shaft 43 which carries the roller 7.

The toothed drive gear 42 engages and drives a like drive gear 44 on the shaft 45 which carries the roller 4.

The toothed gear 44 engages a like toothed gear 46 on the shaft 47 which carries the roller 6.

On the end of the shaft 45 opposite that above described, there is provided a sprocket 48 which drives the sprocket 49 on the shaft 50 by means of a chain 51 and on the like end of the shaft 43 there is provided a sprocket 52 which drives the sprocket 53 by means of the chain 55.

The rollers 25 and 26 are connected with and are driven by the shafts 50 and 54 respectively through the drive chains 56 and 57 in the manner above described.

The reciprocating knife 32 positioned at the discharge mouth 27 is mounted on a knife carrier 58 which slides vertically in the frame 59.

The carrier 58 is connected by means of links 60 and 61 to the ends of a pair of rocking beams 62 and 63 which are pivoted on the shaft 47.

The beams 62 and 63 are rocked by means of cams 64 and 65 respectively arranged on opposite sides of the machine and which are carried by a shaft 66 to which power is supplied from the shaft 47 by means of the chains 67 and 68.

The device being thus assembled, operative power is provided by the motor 33 in the usual manner and the machine thereby set in motion.

The dough to be divided is placed in the hopper 2.

The rotation of the roller 4 and its flanges 5 draws the dough from the hopper and, by means of the rotating rollers 4, 6, 7, 8 and 9 the dough is carried along the passageway above described to the plates 23 and 24 and thence between said plates and the rollers 25 and 26 to the discharge mouth 27.

The cams 65 and 66 are adjusted to cause the knife 32 to descend when the desired quantity of dough projects from the mouth or discharge port 27, whereby the projecting dough will be cut off and will be carried away by a conveyor 69 of any desired type.

Having thus described my invention, what I claim is:

1. In a device of the character specified the combination of a hopper having a discharge mouth, a flanged roller in said mouth, a plurality of auxiliary guide rollers spaced circumferentially about and substantially equidistant from said first mentioned roller and coacting therewith, scraper plates adjacent said rollers whereby is formed a discharge passage from said hopper having a delivery mouth, rollers at said delivery mouth, a movable knife at said delivery mouth and means for driving said rollers and said knife.

2. In a device of the character described, the combination of a frame, a knife slidable in said frame, a rocking beam operatively connected with said knife, a cam means for intermittently moving the said rocking beam and thereby raising and lowering the said knife, and means for delivering dough to the said knife, said means comprising the combination of a hopper having a discharge mouth, a flanged roller in said mouth, a plurality of auxiliary guide rollers spaced circumferentially about and substantially equidistant from said first named roller and coacting therewith, scraper plates adjacent said rollers whereby is formed a discharge passage from said hopper, rollers at the delivery end of the said discharge passage and positioned to deliver the dough to said knife, and means for driving the said rollers.

3. In a device of the character described, the combination of a hopper and a cutting member, a roller in the mouth of said hopper, a plurality of rollers spaced circumferentially about and substantially equidistant from said first named roller and forming a passage therebetween, and a pair of rollers positioned at the discharge end of the said passage between which rollers dough passes from the said hopper to the said cutting member, scraper plates arranged peripherally adjacent the said rollers and drive means for said rollers and said cutting member.

4. In a device of the character described, the combination of a hopper having a discharge mouth, a pair of spaced rollers at the said discharge mouth of the hopper and positioned to draw between them from hopper the contents thereof, a conveyor roller spaced from the said two first named rollers and positioned to convey and guide the contents of the hopper, a pair of spaced rollers positioned to receive between them material from said conveyor roller, scraper plates arranged peripherally between the said rollers, guide plates positioned to receive material from the last named pair of spaced rollers, a pair of rollers positioned to receive the said material from said last named guide plates, a knife adjacent the said last named pair of rollers and adapted to cut off portions of the said material, and means for driving said rollers and knife.

CHARLES G. STEFFEN.